United States Patent
He et al.

(10) Patent No.: US 8,941,313 B2
(45) Date of Patent: Jan. 27, 2015

(54) LIGHT EMITTING UNIT DRIVING CIRCUIT AND LIGHT EMITTING DEVICE

(75) Inventors: Haixiang He, Guangdong (CN); Wanchun Jiang, Guangdong (CN); Martin Brueckel, Heidenheim (DE); Hu Wang, Guangdong (CN)

(73) Assignee: OSRAM AG, Munich (DE)

( * ) Notice: Subject to any disclaimer, the term of this patent is extended or adjusted under 35 U.S.C. 154(b) by 0 days.

(21) Appl. No.: 13/821,015

(22) PCT Filed: Aug. 23, 2011

(86) PCT No.: PCT/EP2011/064430
§ 371 (c)(1),
(2), (4) Date: Mar. 6, 2013

(87) PCT Pub. No.: WO2012/031883
PCT Pub. Date: Mar. 15, 2012

(65) Prior Publication Data
US 2013/0169158 A1 Jul. 4, 2013

(30) Foreign Application Priority Data
Sep. 6, 2010 (CN) .......................... 2010 1 0275196

(51) Int. Cl.
*H05B 37/02* (2006.01)
*H05B 33/08* (2006.01)

(52) U.S. Cl.
CPC ............ *H05B 37/02* (2013.01); *H05B 33/0818* (2013.01); *H05B 33/0851* (2013.01)

USPC .................. 315/209 R; 315/291; 315/307

(58) Field of Classification Search
CPC .... H05B 37/00; H05B 37/02; H05B 33/0818; H05B 33/0851
USPC .............. 315/209 R, 224–226, 291, 307, 308
See application file for complete search history.

(56) References Cited

U.S. PATENT DOCUMENTS

| | | | |
|---|---|---|---|
| 2006/0076901 A1 | 4/2006 | Lin | |
| 2006/0244394 A1 | 11/2006 | Huang | |
| 2006/0279228 A1* | 12/2006 | Kato | 315/193 |
| 2008/0129225 A1 | 6/2008 | Yamamoto et al. | |
| 2009/0015174 A1* | 1/2009 | Huang et al. | 315/250 |

FOREIGN PATENT DOCUMENTS

CN 10161652 A 12/2009
FR 2763203 A1 11/1998

OTHER PUBLICATIONS

English language abstract of FR 2 763 203 dated Nov. 13, 1998.
Office action dated Sep. 3, 2014, received for the parallel Chinese application 201010275196.7 inclusive of English translation.

* cited by examiner

Primary Examiner — Jimmy Vu (57) ABSTRACT

A light emitting unit driving circuit may include: an operating voltage supplying unit configured to supply a voltage input for the driving circuit; a driving unit coupled to the operating voltage supplying unit and configured to drive the light emitting unit to make the light emitting unit turn on or turn off; and a feedback control unit coupled between the driving unit and the light emitting unit, and configured to form a feedback loop together with the driving circuit and the light emitting unit to stabilize an operating current of the light emitting unit.

9 Claims, 3 Drawing Sheets

LIGHT EMITTING UNIT DRIVING CIRCUIT AND LIGHT EMITTING DEVICE

RELATED APPLICATIONS

The present application is a national stage entry according to 35 U.S.C. §371 of PCT application No.: PCT/EP2011/064430 filed on Aug. 23, 2011, which claims priority from Chinese application No.: 201010275196.7 filed on Sep. 6, 2010.

TECHNICAL FIELD

Various embodiments relate to a field of illumination, and e.g. to a light emitting unit driving circuit and light emitting device.

BACKGROUND

Figure 1:
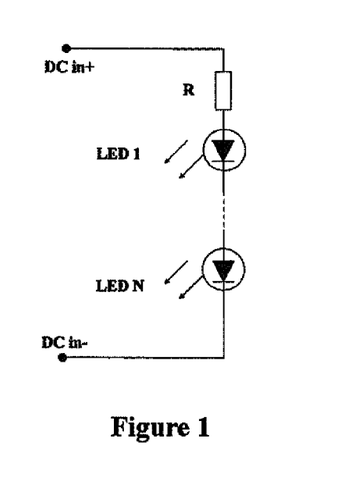
FIG. 1 is a schematic diagram of a light emitting unit driving circuit in the prior art.

Currently, in terms of driving for a light emitting unit, the driving for the light emitting unit (e.g., LED 1~LED N) is generally realized by using resistors connected with several light emitting units in series in low end application, as shown in FIG. 1. Such scheme causes an output current to vary with variation of an input voltage, resulting in unstablility or flicker of LEDs' brightness. In high end application, a pulse width modulation dimming integrated circuit (PWM IC), for example, a buck circuit and a boost circuit, is usually adopted. Such scheme has a high cost and circuit configuration is complicated.

Further, in terms of soft switching on/off of the light emitting unit, thermal inertia is utilized to realize soft switching on/off in some applications using an incandescent lamp in early times. At present, in order to realize a soft switching on/off function, a programmable microcontroller is often adopted to regulate a PWM control signal, and such scheme has a high cost.

Moreover, in terms of dimming of the light emitting unit, a controllable PWM IC is adopted widely, and an additional logical signal is used to perform dimming. Since an additional control signal is required, system design is complicated while the cost is high.

SUMMARY

Hereinafter, a brief summary about the invention is given to provide a basic understanding on some aspects of the invention. It should be appreciated that this summary is not an exhaustive summary of the invention. It is not intended to determine essential or important parts of the invention, nor does it intend to define the scope of the invention. An object thereof is merely to present some concepts in a simplified form and hereby acts as a preamble of detailed description which will be discussed later.

Based on the above problems, there is an urgent need for a solution that can provide a constant output current for different input voltages. The inventor proposes a light emitting unit driving circuit which solves at least one of problems existing in the prior art described above and which has a simple configuration and low cost.

According to an embodiment of the invention, there is provided a light emitting unit driving circuit, which may include: an operating voltage supplying unit for supplying a voltage input for the driving circuit; a driving unit coupled to the operating voltage supplying unit and configured to drive the light emitting unit to make the light emitting unit turn on or off; and a feedback control unit coupled between the driving unit and the light emitting unit and forming a feedback loop therewith to stabilize an operating current of the light emitting unit.

According to a preferred embodiment of the invention, the driving circuit may further include a dimming unit coupled between the light emitting unit and the feedback control unit and configured to regulate a current level of the feedback control unit, and thereby dimming the light emitting unit.

According to a preferred embodiment of the invention, the driving circuit may further include a switch unit and a soft switching on/off setting unit, which are successively coupled in series between the operating voltage supplying unit and the driving unit, in which the switch unit controls the soft switching on/off setting unit to operate in a soft switching on setting state or a soft switching off setting state, so as to control soft switching on or off of the light emitting unit.

Preferably, the driving unit may be configured to include a first transistor in which a collector is connected to a positive input terminal of the operating voltage supplying unit, an emitter is connected to the light emitting unit, and a base is connected to a first control terminal of the feedback control unit via a first base resistor and connected to the positive input terminal of the operating voltage supplying unit via an input resistor.

Preferably, the feedback control unit may be configured to include a second transistor in which a collector as the first control terminal is connected to the base of the first transistor via the first base resistor, an emitter is connected to a negative input terminal of the operating voltage supplying unit, and a base is connected to one end of a dimming resistor via a second base resistor, the other end of the dimming resistor being connected to the negative input terminal of the operating voltage supplying unit, and wherein the feedback loop constituted by the first transistor, the first base resistor, the second transistor, the second base resistor and the light emitting unit is configured to stabilize the operating current of the light emitting unit.

As a preferred embodiment, the driving unit may be configured to include a first transistor in which a collector is connected to the positive input terminal of the operating voltage supplying unit, an emitter is connected to the light emitting unit, and a base is connected to a first setting terminal of the soft switching on/off setting unit via the first base resistor.

Preferably, the soft switching on/off setting unit may be configured to include a soft switching on setting loop constituted by a soft switching on setting resistor and a common soft switching on/off setting capacitor and a soft switching off setting loop constituted by a soft switching off setting resistor and the soft switching on/off setting capacitor, wherein in the soft switching on setting loop, the soft switching on setting resistor is connected between the first setting terminal of the soft switching on/off setting unit and one end of the switch unit, the other end of the switch unit being connected to the positive input terminal of the operating voltage supplying unit, and the soft switching on/off setting capacitor is connected between the first setting terminal and a second control terminal of the feedback control unit; and in the soft switching off setting loop, the soft switching off setting resistor is connected between the first setting terminal and the negative input terminal of the operating voltage supplying unit.

As another preferred embodiment, the feedback control unit may be configured to include a second transistor, a diode and a second base resistor, in which a collector of the second transistor is connected to a second setting terminal of the soft switching on/off setting unit via a second collector resistor, an emitter thereof is connected to the negative input terminal of the operating voltage supplying unit, a base thereof is connected to a negative end of the diode, a positive end of the diode being connected with one end of the second base resistor, the other end of the second base resistor being connected to a dimming control output terminal of the dimming unit, an operating voltage input terminal of the dimming unit being connected to the negative input terminal of the operating voltage supplying unit, a dimming input terminal of the dimming unit being connected to the light emitting unit, and the base of the second transistor as a second control terminal is further connected to the soft switching on/off setting capacitor of the soft switching on/off setting unit, and in which the diode is configured to prevent the soft switching on/off setting capacitor from discharging via the second base resistor.

Preferably, the dimming unit may be configured to be a variable resistor connected between the light emitting unit and the negative terminal of the operating voltage supplying unit, so as to regulate the operating current of the feedback control unit and thereby dimming the light emitting unit.

According to another aspect of the invention, there is provided a light emitting device which may include at least one light emitting unit and the above-described driving circuit used to drive the at least one light emitting unit to operate.

Preferably, the above-described light emitting unit may be a LED.

The driving circuit provided according to the embodiments of the invention may realize a steady constant current output by feedback control with respect to any input voltage, and has a simpler configuration and a significantly reduced cost as compared with the PWM scheme in the prior art.

Furthermore, according to the embodiments provided by the invention, a soft switching on and off function of the light emitting unit may be realized on a basis of the constant current output, thus making human's eyes feel more comfortable.

Further, according to the embodiments provided by the invention, dimming of the light emitting unit may be performed while based on the constant current output.

In addition, according to the embodiments provided by the invention, dimming of the light emitting unit may be performed while a constant current output function and the soft switching on and off function of the light emitting unit are realized.

BRIEF DESCRIPTION OF THE DRAWINGS

The above and other objects, characteristics and advantages of the invention will be better understood with reference to the description of embodiments of the invention given below in combination with the accompanying drawings. In the drawings, identical or corresponding technical features or components will be denoted by identical or corresponding reference numbers. The accompanying drawings together with the following detailed description are included in this specification and form a part of this specification, and serve to further illustrate preferred embodiments of the invention and to explain operation processes and advantages of the invention by way of example. In the drawings.

DETAILED DESCRIPTION

The following detailed description refers to the accompanying drawings that show, by way of illustration, specific details and embodiments in which the invention may be practiced.

Exemplary embodiments of the invention will be described in combination with the accompanying drawings hereinafter. For the sake of clarity and conciseness, not all the features of actual implementations are described in the specification. However, it should be appreciated that, numerous decisions specific to implementations must be made during development of any such actual embodiments, so as to achieve developers' specific goals, for example, compliance with system-related and business-related constraints which will vary from one implementation to another. Further, it should also be appreciated that, such a development effort might be very complex and time-consuming, but may nevertheless be a routine task for those skilled in the art having the benefit of this disclosure.

Herein, it shall further be noted that, for avoiding unnecessary details obscuring the invention, only device structures and/or processing steps closely relevant to schemes according to the invention are shown in the accompanying drawings while omitting other details less relevant to the invention.

Light Emitting Unit Driving Circuit

The First Implementation

Figure 2:
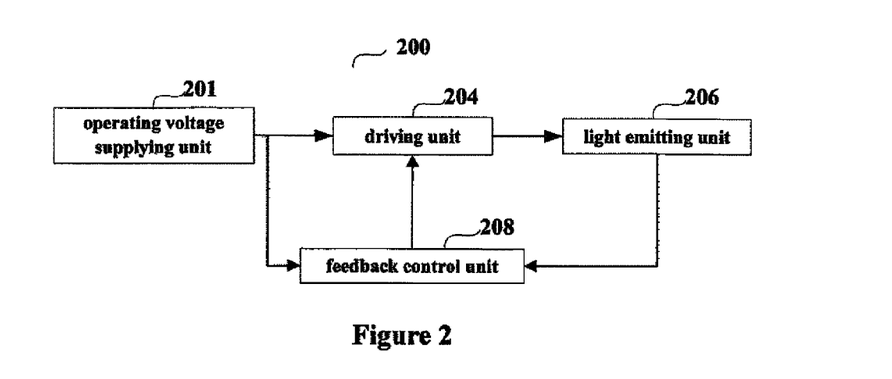
FIG. 2 illustrates a block diagram of a light emitting unit driving circuit according to an embodiment of the invention.

Various embodiments of the invention are described in combination with the drawings below. FIG. 2 illustrates a block diagram of a light emitting unit driving circuit according to an embodiment of the invention. In FIG. 2, a driving circuit 200 includes an operating voltage supplying unit 201, a driving unit 204, a light emitting unit 206 and a feedback control unit 208. The operating voltage supplying unit 201 supplies a voltage input for the driving circuit 200, e.g., a direct current input. The driving unit 204 is coupled to the operating voltage supplying unit 201 and is configured to drive the light emitting unit 206, which may for example be a LED, so as to make the light emitting unit 206 turn on or turn off. The feedback control unit 208 is coupled between the driving unit 204 and the light emitting unit 206 and forms a feedback loop therewith to stabilize an operating current of the light emitting unit.

The operation process of the driving circuit 200 is described with reference to FIG. 2 below. In this operation process, constant current output of the light emitting unit 206 is achieved by a closed cycle formed with the driving unit 204, the feedback control unit 208 and the light emitting unit 206. Specifically, after the operating voltage supplying unit 201 supplies a voltage input, a current passes through the driving unit 204 so that a current flowing via the light emitting unit 206 rises. Next, the current flowing via the light emitting unit 206 flows into the feedback control unit 208 to cause it to start operating. The feedback control unit 208 pulls down a current flowing into the driving unit 204 to cause it to stop operating, and thereby resulting in a decrease in a current flowing into the light emitting unit 206. In this case, the feedback control unit 208 is caused to stop operating due to the decrease in the current in the light emitting unit 206. While at this moment, the feedback control unit 208 no longer pulls down the current flowing into the driving unit 204 so that the current flowing into it increases, and the driving unit 204 starts operating, thus causing the current in the light emitting unit 206 to rise again. Thus, constant current output of the light emitting unit 206 is realized by the current cycle described above.

The Second Implementation

Figure 3:
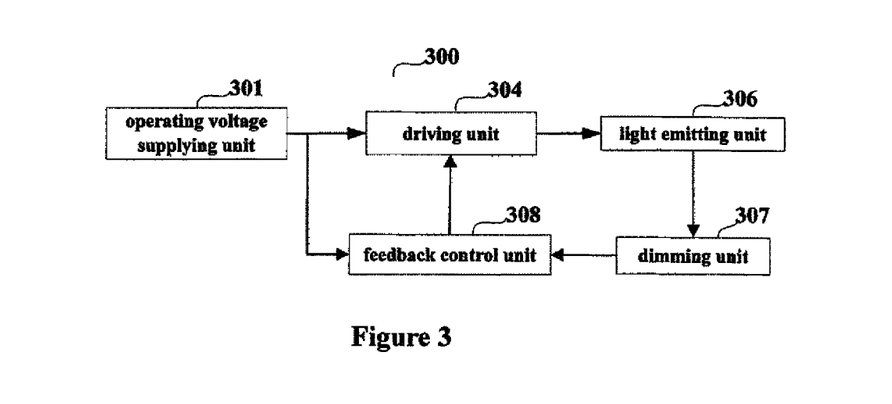
FIG. 3 illustrates a block diagram of a light emitting unit driving circuit according to an embodiment of the invention.

The constant current output is realized in the above-described first implementation. As a preferred implementation of the above-described first implementation, an implementing manner, in which the light emitting unit is dimmed while the constant current output is achieved, is described in combination with FIG. 3. FIG. 3 illustrates a block diagram of a light emitting unit driving circuit according to an embodiment of the invention. In FIG. 3, a driving circuit 300 includes an operating voltage supplying unit 301, a driving unit 304, a light emitting unit 306, a feedback control unit 308 and a dimming unit 307. The dimming unit 307 is coupled between the light emitting unit 306 and the feedback control unit 308 and is configured to regulate a current level of the feedback control unit 308 so as to realize dimming of the light emitting unit 306. The operating voltage supplying unit 301, driving unit 304, light emitting unit 306 and feedback control unit 308 may for example have same or similar structures and functions as the operating voltage supplying unit 201, driving unit 204, light emitting unit 206 and feedback control unit 208 as shown in FIG. 2. For the sake of conciseness, no more description will be made herein.

Dimming process of the dimming unit 307 is described below. After the operating voltage supplying unit 301 supplies a voltage input, a current passes through the driving unit 304 so that a current flowing via the light emitting unit 306 rises. Next, the current flowing via the light emitting unit 306 flows into the dimming unit 307. The current flowing into the feedback control unit 308 may be controlled by regulating the dimming unit 307, and thus causing the feedback control unit 308 to start operating. The feedback control unit 308 pulls down a current flowing into the driving unit 304 to cause it to stop operating, and thereby resulting in a decrease in a current flowing into the light emitting unit 306. In this case, due to the decrease in the current in the light emitting unit 306, the feedback control unit 308 is caused to stop operating after the current flows via the dimming unit 307. While at this moment, the feedback control unit 308 no longer pulls down the current flowing into the driving unit 304 so that the current flowing into the driving unit 304 increases, and the driving unit 304 starts operating, thus causing the current in the light emitting unit 306 to rise again. Thus, the constant current output of the light emitting unit 306 is realized by the current cycle described above. Meanwhile, since the current flowing into the feedback control unit 308 can be controlled by regulating the dimming unit 307 so that current variation in the above-described cycle is controlled and the dimming process of the light emitting unit 306 is realized.

The Third Implementation

In the light emitting unit driving circuit, in addition to the requirement of realization of constant current output, it is desired that soft switching on and soft switching off of the light emitting unit can be realized in order to provide the user with soft light emitting experience. That is, the current flowing via the light emitting unit (e.g., a LED) may be caused to have a varying curve rather than a spike after a switch operates (e.g., turns on or off). In other words, when the switch turns on and turns off, brightness of the light emitting unit may change gently rather than abruptly, thus making the human's eyes feel more comfortable.

Figure 4:
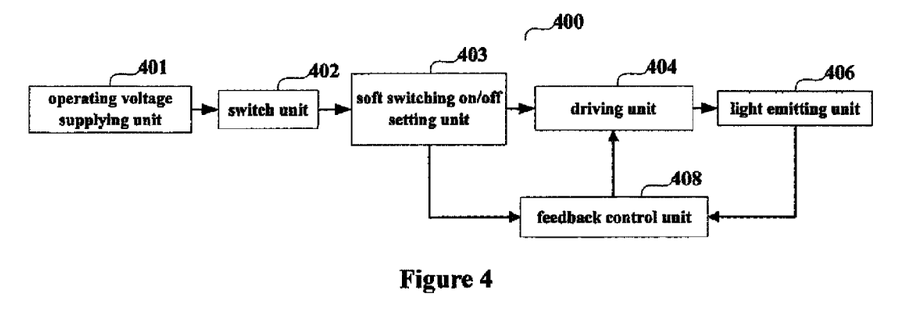
FIG. 4 illustrates a block diagram of a light emitting unit driving circuit according to an embodiment of the invention.

An implementation for achieving soft switching on/off function of the light emitting unit is described in combination with FIG. 4. FIG. 4 illustrates a block diagram of a light emitting driving circuit according to an embodiment of the invention. A driving circuit 400 includes an operating voltage supplying unit 401, a switch unit 402, a soft switching on/off setting unit 403, a driving unit 404, a light emitting unit 406 and a feedback control unit 408. The switch unit 402 is coupled between the operating voltage unit supplying unit 401 and the driving unit 404. The soft switching on/off setting unit 403 is coupled between the switch unit 402 and the driving unit 404. The switch unit 402 controls the soft switching on/off setting unit 403 to operate in a soft switching on setting state or a soft switching off setting state. The operating voltage supplying unit 401, driving unit 404, light emitting unit 406 and feedback control unit 408 have same or similar structures and functions as the operating voltage supplying unit 201, driving unit 204, light emitting unit 206 and feedback control unit 208 as shown in FIG. 2. For the sake of conciseness, no more description will be made herein.

An operation process for realizing soft switching on/off of the light emitting unit 406 by the soft switching on/off setting unit 403 is described below. After the switch unit 402 closes, an energy storage element in the soft switching on/off setting unit 403 stores charges to perform charging. Due to a shunting of the operation current caused by charging, as the charging amount increases, an input current of the driving unit 404 rises in a curve form, and an output current thereof also rises in a curve form, so that a current flowing via the light emitting unit 406 also rises in a curve form, and thus soft switching on of the light emitting unit 406 is realized. A time constant determined by a charging loop of the energy storage element defines a rate of soft switching on of the light emitting unit 406. After the above-described current cycle, the driving circuit 400 comes into a steady operating state, and achieves constant current output of the light emitting unit 406. After the switch unit 402 opens, electric quantity stored in the energy storage element in the soft switching on/off setting unit 403 maintains the input current of the driving unit 404, causing its output current to decrease in a curve form, so that the current flowing via the light emitting unit 406 also decreases in a curve form, and thus soft switching off of the light emitting unit 406 is realized. Meanwhile, the energy storage element discharges through a discharge loop, and a time constant determined by the discharge loop defines a rate of soft switching off.

The Fourth Implementation

Figure 5:
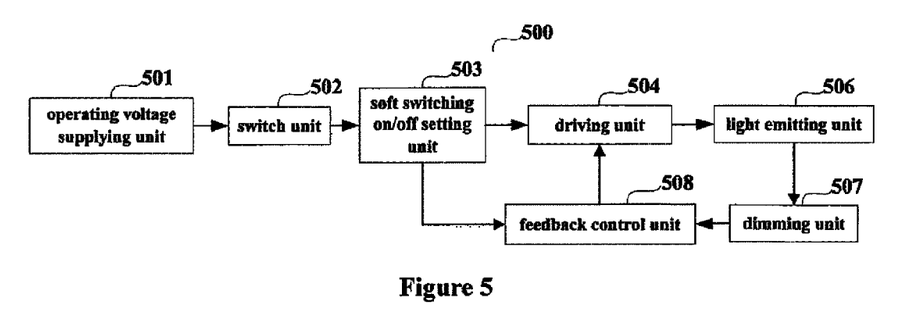
FIG. 5 illustrates a block diagram of a light emitting unit driving circuit according to an embodiment of the invention.

The preferred implementation in which the soft switching on/off function is further realized based on the second implementation has been described in the above-described third implementation. Next, a fourth implementation further having a dimming function is described in combination with FIG. 5. FIG. 5 illustrates a block diagram of a light emitting unit driving circuit according to an embodiment of the invention. In FIG. 5, a driving circuit 500 includes an operating voltage supplying unit 501, a switch unit 502, a soft switching on/off setting unit 503, a driving unit 504, a light emitting unit 506, a feedback control unit 508 and a dimming unit 507. The dimming unit 507 is coupled between the light emitting unit 506 and the feedback control unit 508 and is configured to regulate a current level of the feedback control unit 508 so as to realize dimming of the light emitting unit 506. Structures and functions of the operating voltage supplying unit 501, driving unit 504, light emitting unit 506 and feedback control unit 508 may be for example identical or similar to the those of the operating voltage supplying unit 201, driving unit 204, light emitting unit 206 and feedback control unit 208 as shown in FIG. 2. A structure and function of the dimming unit 507 may be for example identical or similar to those of the dimming unit 307 as shown in FIG. 3. A structure and function of the soft switching on/off setting unit 503 may be for example identical or similar to those of the soft switching on/off setting unit 403 as shown in FIG. 4. For the sake of conciseness, no more description will be made herein.

How the functions of constant current output, dimming and soft switching on/off of the light emitting unit are realized by the driving circuit 500 is described with reference to FIG. 5 below. The operating voltage supplying unit 501 supplies the voltage input for the driving circuit 500. After the switch unit 502 closes, an energy storage element in the soft switching on/off setting unit 503 stores charges to perform charging. As the charging amount increases, an input current of the driving unit 504 rises in a curve form, and its output current also rises in a curve form, so that a current flowing via the light emitting unit 506 also rises in a curve form, and thus soft switching on of the light emitting unit 506 is realized. After the above-described current cycle, the driving circuit 500 comes into a steady operating state, and constant current output of the light emitting unit 506 is achieved. During the current cycle, as mentioned above, it is possible to control a current flowing into the feedback control unit 508 by regulating the dimming unit 507, so that current variation in the cycle is controlled, and thus dimming process of the light emitting unit 506 is realized. After the switch unit 502 opens, electric quantity stored in the energy storage element in the soft switching on/off setting unit 503 maintains an input current of the driving unit 504, causing its output current to decrease in a curve form, so that the current flowing via the light emitting unit 506 also decreases in a curve form, and thus soft switching off of the light emitting unit 506 is realized.

The Fifth Implementation

Four implementations of the invention are described in combination with FIGS. 2 to 5 above. One specific example of the above-described implementations is described in combination with a specific circuit example below.

Figure 6:
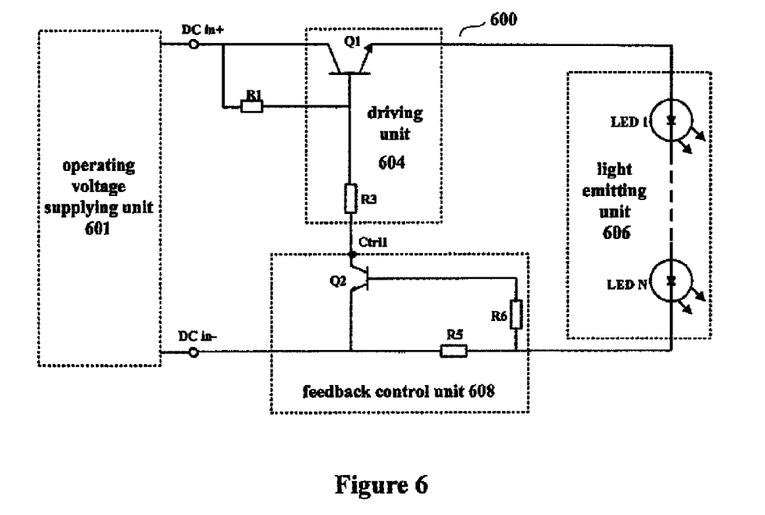
FIG. 6 illustrates a circuit diagram of a light emitting unit driving circuit according to an embodiment of the invention.

FIG. 6 illustrates a circuit diagram of a light emitting unit driving circuit 600 of this example. The driving circuit 600 includes an operating voltage supplying unit 601, a driving unit 604, a feedback control unit 608 and a light emitting unit 606. It should be noted that, FIG. 6 only illustrates a particular implementing manner provided according to the embodiment of the invention. Those skilled in the art may implement various alternative implementations of the invention according to the functional block diagram of the embodiment of the invention and by combining with the existing technology in the art that they master.

The operating voltage supplying unit 601 may for example supply a DC input. If an industrial standardized AC-DC conversion module is added, the operating voltage supplying unit 601 may also be spread to generate a DC voltage to be supplied based on an AC input. The driving unit 604 may include a first transistor Q1, in which a collector is connected to a positive input terminal DC in+ of the operating voltage supplying unit 601, an emitter is connected to the light emitting unit 606, and a base is connected to a first control terminal Ctrl1 (herein, a collector of a second transistor Q2 may be set to be the first control terminal Ctrl1) of the feedback control unit 608 via a first base resistor R3 and is connected to the positive input terminal DC in+ of the operating voltage supplying unit 601 via an input resistor R1. The first transistor Q1 may be a bipolar power transistor and serves as a linear amplifier tube with its characteristic of operating in a linear amplification region. The input resistor R1 is used to determine an operating point of the first transistor Q1.

The feedback control unit 608 may include a second transistor Q2, in which a collector as the first control terminal is connected to the base of the first transistor Q1 via the first base transistor R3, an emitter is connected to a negative input terminal DC in− of the operating voltage supplying unit, and a base is connected to one end of a resistor R5 via a second base resistor R6, the other end of the resistor R5 being connected to the negative input terminal of the operating voltage supplying unit. On and off of the second transistor Q2 controls a current flowing into the base of the first transistor Q1, and thereby controlling on and off of the first transistor Q1. The second transistor Q2 may be a small package transistor, for example, on and off characteristic thereof serving as a base control tube of the first transistor Q1. The second base resistor R6 is used to determine an operating point of the second transistor Q2.

A feedback circuit constituted by the first transistor Q1 together with the second transistor Q2, the first base resistor R3 and the second base resistor R6 achieves a constant current output of an output terminal of the driving circuit, while consuming extra energy of the operating voltage supplying unit 601, this is because the voltage supplied by the operating voltage supplying unit 601 must be higher than the voltage of the light emitting unit 606.

An operation process of realizing constant current output of the light emitting unit by the driving circuit 600 is specifically described in combination with FIG. 6 below. After the operating voltage supplying unit 601 supplies a voltage input, the input current causes a base current flowing into the first transistor Q1 to increase through an input resistor R1 and makes Q1 conduct, and subsequently, the light emitting unit 606 (for example may be a LED) begins illuminating. When the current flowing via the resistor R5 increases large enough, a current flowing into the second transistor Q2 via the second base resistor R6 is caused to increase so that the second transistor Q2 conducts. A collector current of the second transistor Q2 increases so that a base current flowing into the base of the first transistor Q1 is pulled down, causing the current flowing into the base of the first transistor Q1 via the first base resistor R3 to decrease, and thus the first transistor Q1 stops conducting. In this case, a current flowing into the light emitting unit 606 decreases, thereby a voltage on the resistor R5 decreases, so that the second transistor Q2 is caused to stop conducting. Thus, the second transistor Q2 no longer pulls down the current flowing into the base of the first transistor Q1, so that the base voltage of the first transistor Q1 rises and the first transistor Q1 conducts again, thus causing the current in the light emitting unit 606 to rise. Till now, the driving circuit 600 reaches a steady operating state and the constant current output is realized.

The resistor R5 in FIG. 6 takes a constant value. However, as necessary, the resistor R5 may be replaced with a variable resistor, or an additional variable resistor may be added to realize dimming of the light emitting unit, which will be described below.

The Sixth Implementation

Figure 7:
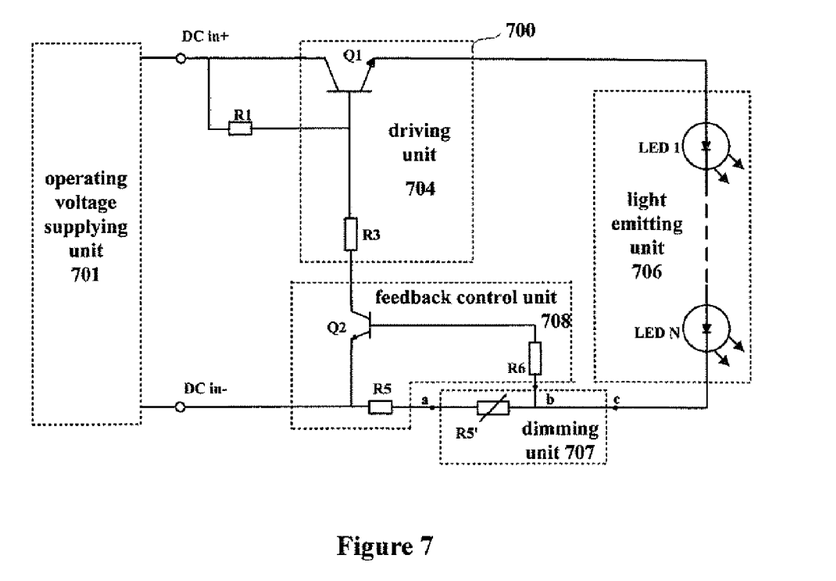
FIG. 7 illustrates a circuit diagram of a light emitting unit driving circuit according to an embodiment of the invention.

A specific example of an implementation with a dimming function is described in combination with FIG. 7 below. FIG. 7 illustrates a circuit diagram of a light emitting unit driving circuit 700 according to a preferred embodiment of the invention. In FIG. 7, the driving circuit 700 includes an operating voltage supplying unit 701, a driving unit 704, a feedback control unit 708, a light emitting unit 706 and a dimming unit 707. Structures and functions of the operating voltage supplying unit 701, driving unit 704, feedback control unit 708 and light emitting unit 706 may be for example identical or similar to those of the operating voltage supplying unit 601, driving unit 604, feedback control unit 608 and light emitting unit 606 as shown in FIG. 6. For the sake of conciseness, no more description will be made herein.

An operating voltage input terminal a of the dimming unit 707 may be connected to a negative input terminal DC in– of the operating voltage supplying unit 701, a dimming control input terminal c of the dimming unit 707 may be connected to the light emitting unit 706, and a dimming control output terminal b of the dimming unit 707 may be connected to a second base resistor R6 of the feedback control unit 708. The dimming unit 707 may be implemented as a variable resistor R5'. The variable resistor R5' may be connected with the resistor R5 in series between the light emitting unit 706 and the negative terminal DC in– of the operating voltage supplying unit 701, so as to regulate a current level of the feedback control unit 708, and thus dimming of the light emitting unit 706 is realized. Specifically, after the operating voltage supplying unit 701 supplies a voltage input, a current causes a base current flowing into a first transistor Q1 (one specific example of the driving unit 704) to increase through an input resistor R1, thereby causing the first transistor Q1 to conduct, and subsequently, the light emitting unit 706 begins illuminating. When a current flowing via the variable resistor R5' increases large enough, a current flowing into the second transistor Q2 via the second base resistor R6 is caused to increase, thereby causing the second transistor Q2 to conduct. A collector current of the second transistor Q2 increases, so that a current flowing into the base of the first transistor Q1 is pulled down, and thus causing the current flowing into the base of the first transistor Q1 via a first base resistor R3 to decrease and the first transistor Q1 to stop conducting. In this case, a current flowing into the light emitting unit 706 decreases, and thereby the voltage on the variable resistor R5' decreases, so that the second transistor Q2 is caused to stop conducing. Thus, the second transistor Q2 no longer pulls down the current flowing into the base of the first transistor Q1, so that the base voltage of the first transistor Q1 rises and the first transistor Q1 conducts again, and thus causing the current in the light emitting unit 706 to rise. Till now, the driving circuit 700 reaches a steady operating state and the constant current output is realized. Here, it is possible to regulate a current when the second transistor Q2 turns on and off by adjusting the value of the variable resistor R5', so that a current when the first transistor Q1 turns on and off is controlled, and thus dimming of the light emitting unit 706 is realized. It should be noted that, compared to a traditional dimming circuit, it is not to directly regulate the current flowing via the light emitting unit 706 here but to regulate the operating voltage of the feedback control unit 708, that is, an ON voltage of the second transistor Q2, by adjusting the value of the variable resistor R5', so that the current flowing via the light emitting unit 706 is regulated accordingly, and thus a dimming effect is achieved. Therefore, a resistor much smaller than a traditional dimming resistor may be adopted, so that energy consumption of the resistor itself is reduced. Certainly, the dimming unit 707 may be incorporated into the feedback control unit 708, for example, the resistor R5 and the variable resistor R5' may be incorporated together to form an alternative variable resistor R5"(not shown).

The Seventh Implementation

Figure 8:
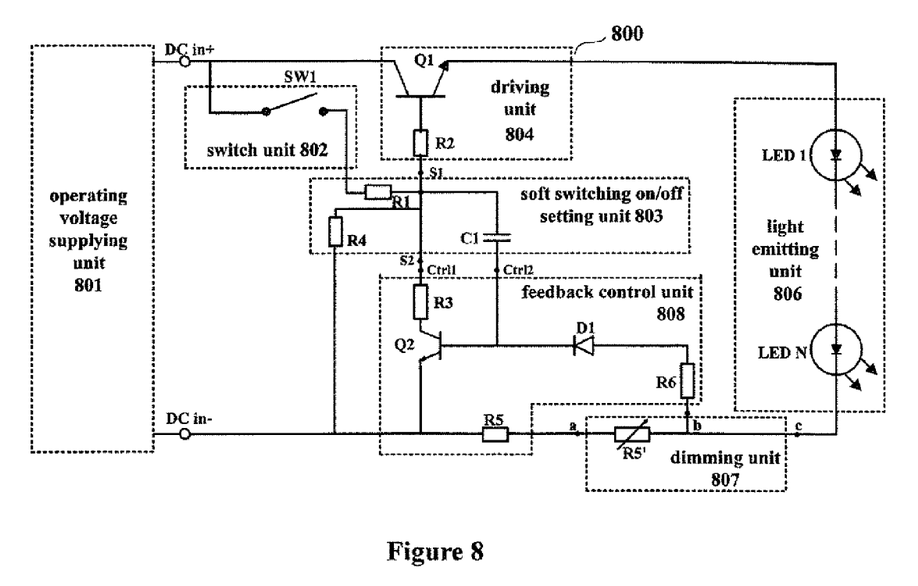
FIG. 8 illustrates a circuit diagram of a light emitting unit driving circuit according to an embodiment of the invention.

Now, on a basis that the constant current output of the driving circuit and the dimming of the light emitting unit are realized, how to realize the soft switching on/off function of the light emitting unit is described in combination with a circuit example of FIG. 8. FIG. 8 illustrates a circuit diagram of a light emitting unit driving circuit 800 according to a preferred embodiment of the invention. The driving circuit 800 includes an operating voltage supplying unit 801, a switch unit 802, a driving unit 804, a soft switching on/off setting unit 803, a light emitting unit 806, a dimming unit 807 and a feedback control unit 808.

As described above, the operating voltage supplying unit 801 may supply a DC input. The switch unit 802 may be a common single-pole single-throw switch SW1, and may also be for example a button switch, a slide switch or other types of switches. The driving unit 804 includes a first transistor Q1 in which a collector is connected to a positive input terminal DC in+ of the operating voltage supplying unit 801, an emitter is connected to the light emitting unit 806, and a base is connected to a first setting terminal S1 of the soft switching on/off setting unit 803 via a first base resistor R2. Here, a point close to R2 between the first base resistor R2 and a resistor R3 is set to be the first setting terminal S1. The first base resistor R2 is used to determine an operating point of the first transistor Q1.

The soft switching on/off setting unit 803 includes a soft switching on/off setting capacitor which may be for example an energy storage capacitor C1, a soft switching on setting resistor which may be for example a charging resistor R1, and a soft switching off setting resistor which may be for example a discharging resistor R4. The energy storage capacitor C1 forms a soft switching on setting loop with the charging resistor R1, and forms a soft switching off setting loop with the discharging resistor R4. The charging resistor R1 is connected between the first setting terminal S1 and one end of the switch unit 802, the other end of the switch unit 802 being connected to the positive input terminal of the operating voltage supplying unit 801, and the energy storage capacitor C1 is connected between the first setting terminal S1 and a second control terminal Ctrl2 of the feedback control unit 808. Here, a point between the base of the second transistor Q2 and a negative end of a diode D1 (as described later) may be set to be the second control terminal Ctrl2. The discharging resistor R4 is connected between the first setting terminal S1 and a negative input terminal DC in– of the operating voltage supplying unit 801.

An operating voltage input terminal a of the dimming unit 807 may be connected to the negative input terminal DC in– of the operating voltage supplying unit 801, a dimming control input terminal c of the dimming unit 807 may be connected to the light emitting unit 806, and a dimming control output terminal b of the dimming unit 807 may be connected to one end of a second base resistor R6 (as described later) of the feedback control unit 808. The dimming unit 807 may include a variable resistor R5'. The variable resistor R5' may be connected with a resistor R5 in series between the light emitting unit 806 and the negative input terminal DC in– of the operating voltage supplying unit 801.

The feedback control unit 808 includes the second transistor Q2, the diode D1 and the second base resistor R6. A collector of the second transistor Q2 is connected to a second setting terminal S2 of the soft switching on/off setting unit at a first control terminal Ctrl1 of the second transistor Q2 through a second collector resistor R3, here, a point close to R3 between the first base resistor R2 and the resistor R3 may be set to be the second setting terminal S2, an emitter thereof is connected to the negative input terminal DC in– of the operating voltage supplying unit, and a base thereof as the second control terminal is connected to the energy storage capacitor C1 and the negative end of the diode D1, a positive end of the diode D1 is connected with one end of the second base resistor R6, the other end of the second base resistor R6 is connected to one end of the variable resistor R5', and the other end of the variable resistor R5' may be connected with the resistor R5 in series to the negative terminal DC in– of the operating voltage supplying unit. The role of the diode D1 is to prevent the energy storage capacitor C1 from discharging through the second base resistor R6 when the switch unit 802 opens.

An operation process of the driving circuit 800 is specifically described in combination with FIG. 8 below. The operating voltage supplying unit 801 supplies the driving circuit 800 with a voltage input, e.g. a DC input. After the switch unit 82 closes, the energy storage element C1 charges through the input resistor R1 and the second transistor Q2 (the base to the emitter). Due to the shunting effect of charging of C1, during the rising of charging amount of C1, a base current flowing into the first transistor Q1 via the first base resistor R2 rises in a logarithmic curve, and its collector current rises in a logarithmic curve, so that the current flowing via the light emitting unit 806 also rises in a logarithmic curve, and thus soft switching on of the light emitting unit 806 is realized.

In the process of soft switching on of the light emitting unit 806, a voltage on the variable resistor R5' rises, so that the current flowing into the second transistor Q2 via the second base resistor R6 increases, and thus causing the second transistor Q2 to conduct. Therefore, a collector current of the second transistor Q2 increases, and a current flowing into the base of the first transistor Q1 via the first base resistor R2 decreases under the pulling down effect of the collector current, thus causing the first transistor Q1 to stop conducting. In this case, a current flowing into the light emitting unit 806 decreases, thereby the voltage on the variable resistor R5' decreases, so that the second transistor Q2 is caused to stop conducting. Since the second transistor Q2 no longer pulls down the current flowing into the base of the first transistor Q1, a base voltage of the first transistor Q1 rises, and the first transistor Q1 conducts again, causing the current in the light emitting unit 806 to rise. Till now, the driving circuit 800 reaches a steady operating state, and the constant current output is realized.

During the current cycle, as mentioned above, the base current of the second transistor Q2 may be controlled by regulating the dimming unit 807 (i.e., the variable resistor R5' here), so that current variation in the cycle is controlled, and thus dimming of the light emitting unit 806 is realized. Certainly, the dimming unit 807 may be incorporated into the feedback control unit 808, the resistor R5 and the variable resistor R5' may be incorporated together to form an alternative variable resistor (not shown), for example.

After the switch unit 802 opens, the energy storage capacitor C1 is prevented from discharging via the second base resistor R6 due to the existence of the diode D1, and thus the electric quantity stored in the energy storage capacitor C1 maintains the base current of the driving unit 804 (i.e., the first transistor Q1).

Therefore, the collector current of the first transistor Q1 decreases in a logarithmic curve, causing the current flowing via the light emitting unit 806 also to decrease in a logarithmic curve, so that soft switching off of the light emitting unit 806 is realized. A time constant determined by the energy storage capacitor C1 and the discharging resistor R4 defines a rate of soft switching off.

Hereto, constant current output, soft switching on/off of the light emitting unit, as well as the dimming function of the light emitting unit are realized by the driving circuit 800.

It should be noted that, installation manner for the switch unit 802 is not limited if the soft switching on/off is not performed, for example, being installed at the input terminal of the operating voltage supplying unit or being omitted. If the soft switching on/off function is to be realized, the switch unit 802 should be installed in a base input circuit of the first transistor Q1.

It should also be noted that, NPN-type transistors are adopted here for the transistors Q1 and Q2. This is only by way of example, and those skilled in the art may also use PNP-type transistors, and only the circuit configuration is required to be adjusted accordingly. Furthermore, other types of circuit configurations may also be used, as long as being able to serve as a linear amplifier.

Values of the resistors and capacitors in the RC loop realizing the soft switching on/off function in FIG. 8 are not limited in theory, and may be taken in accordance with actual applications, for example, be taken in accordance with the rate of soft switching on/off required to be achieved. For example, assume that time for soft switching on is 1 S, and time for soft switching off is 0.5 S, then values of the resistors and the capacitors are as follows: C1 is 22 µF, R1 is 400Ω, R2 is 500Ω, R3 is 500Ω, and R4 is 50 KΩ. It should be noted that, the forgoing examples are only illustrative, and the present invention is not limited thereto. Those skilled in the art could design different parameter values in accordance with specific circuit requirements.

The Eighth Implementation

As another preferred implementation, the variable resistor R5' in the dimming unit 807 in FIG. 8 may also be changed to be a constant resistor or be removed, realizing the constant current output of the driving circuit and the soft switching on/off function of the light emitting unit but not being used for dimming. Since operation processes of the driving circuit 600 for only constant current output and the driving circuit 700 for constant current output and dimming of the light emitting unit are described in FIG. 6 and FIG. 7 respectively, for the sake of conciseness, no more description will be made here.

Light Emitting Device

According to the embodiment of the invention, there is further provided a light emitting device, which may include at least one light emitting unit and the above-described driving circuit for driving the at least one light emitting unit to operate.

Preferably, the light emitting unit may be a LED.

Several specific implementations for implementing the present invention are given above, intending to illustrate rather than limit the invention. The inventor describes multiple implementing manners in combination with specific circuits after proposing an overall conception. It should be noted that, these specific implementations are only illustrative, and those skilled in the art could take other alternative manners to complete the invention.

Finally, it also needs to illustrate that, the terms "includes," "including," or any other variation thereof are intended to cover a non-exclusive inclusion, such that an article or apparatus that includes series of elements includes not only those elements but also other elements not expressly listed or inherent to such article or apparatus. Further, an element proceeded by "includes a . . . " does not, without more constraints, preclude the existence of additional identical elements in the article or apparatus that comprises the element.

Although implementations of the present invention and advantages thereof have been described in combination with the accompanying drawings in detail, it should be appreciated that, the above described implementations are only used to explain the invention and are not constructed as limitations to the invention. Various modifications and alterations may be affected to the above described implementations by one skilled in the art without departing from the essential and scope of the invention. Therefore, the scope of the invention is defined by the appended claims and equivalents thereof only, and various changes, replacements and transformations may be made without going beyond the spirit and scope of the invention defined by the appended claims.

FIG. 2
201 operating voltage supplying unit
204 driving unit
206 light emitting unit
208 feedback control unit FIG. 3
301 operating voltage supplying unit
304 driving unit
306 light emitting unit
307 dimming unit
308 feedback control unit FIG. 4
401 operating voltage supplying unit
402 switch unit
403 soft switching on/off setting unit
404 driving unit
406 light emitting unit
408 feedback control unit FIG. 5
501 operating voltage supplying unit
502 switch unit
503 soft switching on/off setting unit
504 driving unit
506 light emitting unit
507 dimming unit
508 feedback control unit FIG. 6
601 operating voltage supplying unit
604 driving unit
606 light emitting unit
608 feedback control unit FIG. 7
701 operating voltage supplying unit
704 driving unit
706 light emitting unit
707 dimming unit
708 feedback control unit FIG. 8
801 operating voltage supplying unit
802 switch unit
803 soft switching on/off setting unit
804 driving unit
806 light emitting unit
807 dimming unit
808 feedback control unit

The invention claimed is:

1. A driving circuit for driving a light emitting unit to operate, the driving circuit comprising:
an operating voltage supplying unit configured to supply a voltage input for the driving circuit;
a driving unit coupled to the operating voltage supplying unit and configured to drive the light emitting unit to make the light emitting unit turn on or turn off; and
a feedback control unit coupled between the driving unit and the light emitting unit, and configured to form a feedback loop together with the driving circuit and the light emitting unit to stabilize an operating current of the light emitting unit;
wherein the driving unit comprises a switch unit and a soft switching on/off setting unit successively coupled in series between the operating voltage supplying unit and the driving unit,
wherein the switch unit controls the soft switching on/off setting unit to operate in a soft switching on setting state or a soft switching off setting state so as to control soft switching on or off of the light emitting unit; and
wherein the driving unit is configured to comprise a first transistor, a base thereof being connected to a positive input terminal of the operating voltage supplying unit, an emitter thereof being connected to the light emitting unit, and a base thereof being connected to a first setting terminal of the soft switching on/off setting unit via a first base resistor.

2. The driving circuit as claimed in claim 1, further comprising: a dimming unit coupled between the light emitting unit and the feedback control unit and configured to regulate a current level of the feedback control unit so as to dim the light emitting unit.

3. The driving circuit as claimed in claim 2, wherein the dimming unit is configured to be a variable resistor, which is connected between the light emitting unit and a negative terminal of the operating voltage supplying unit and is used to regulate an operating current of the feedback control unit so as to dim the light emitting unit.

4. The driving circuit as claimed in claim 1, wherein the driving unit is configured to comprise a first transistor, a collector thereof being connected to a positive input terminal of the operating voltage supplying unit, an emitter thereof being connected to the light emitting unit, and a base thereof being connected to a first control terminal of the feedback control unit via a first base resistor and being connected to the positive input terminal of the operating voltage supplying unit via an input resistor.

5. The driving circuit as claimed in claim 4, wherein the feedback control unit is configured to comprise a second transistor, a collector thereof as the first control terminal being connected to the base of the first transistor via the first base resistor, an emitter thereof being connected to a negative input terminal of the operating voltage supplying unit, and a base thereof being connected to one end of a dimming resistor via a second base resistor, the other end of the dimming resistor being connected to the negative input terminal of the operating voltage supplying unit, and wherein the feedback loop constituted by the first transistor, the first base resistor, the second transistor, the second base resistor and the light emitting unit is configured to stabilize the operating current of the light emitting unit.

6. The driving circuit as claimed in claim 1, wherein the soft switching on/off setting unit is configured to comprise a soft switching on setting loop constituted by a soft switching on setting resistor and a common soft switching on/off setting capacitor and a soft switching off setting loop constituted by a soft switching off setting resistor and the soft switching on/off setting capacitor, wherein in the soft switching on setting loop, the soft switching on setting resistor is connected between the first setting terminal of the soft switching on/off setting unit and one end of the switch unit, the other end of the switch unit being connected to the positive input terminal of the operating voltage supplying unit, and the soft switching on/off setting capacitor is connected between the first setting terminal and a second control terminal of the feedback control unit; and in the soft switching off setting loop, the soft switching off setting resistor is connected between the first setting terminal and a negative input terminal of the operating voltage supplying unit.

7. The driving circuit as claimed in claim 6, wherein the feedback control unit is configured to comprise a second transistor, a diode and a second base resistor, a collector of the second transistor being connected to a second setting terminal of the soft switching on/off setting unit via a second collector resistor, an emitter thereof being connected to the negative input terminal of the operating voltage supplying unit, and a base thereof being connected to a negative end of the diode, a positive end of the diode being connected with one end of the second base resistor, the other end of the second base resistor being connected to a dimming control output terminal of the dimming unit, an operating voltage input terminal of the dimming unit being connected to the negative input terminal of the operating voltage supplying unit, a dimming input terminal of the dimming unit being connected to the light emitting unit, and the base of the second transistor as the second control terminal being further connected to the soft switching on/off setting capacitor of the soft switching on/off setting unit, and wherein the diode is configured to prevent the soft switching on/off setting capacitor from discharging via the second base resistor.

8. A light emitting device, comprising:
   at least one light emitting unit; and
   a driving circuit for driving the at least one light emitting unit to operate, the driving circuit comprising:
   an operating voltage supplying unit configured to supply a voltage input for the driving circuit;
   a driving unit coupled to the operating voltage supplying unit and configured to drive the light emitting unit to make the light emitting unit turn on or turn off; and
   a feedback control unit coupled between the driving unit and the light emitting unit, and configured to form a feedback loop together with the driving circuit and the light emitting unit to stabilize an operating current of the light emitting unit;
   wherein the driving unit comprises a switch unit and a soft switching on/off setting unit successively coupled in series between the operating voltage supplying unit and the driving unit,
   wherein the switch unit controls the soft switching on/off setting unit to operate in a soft switching on setting state or a soft switching off setting state so as to control soft switching on or off of the light emitting unit; and
   wherein the driving unit is configured to comprise a first transistor, a base thereof being connected to a positive input terminal of the operating voltage supplying unit, an emitter thereof being connected to the light emitting unit, and a base thereof being connected to a first setting terminal of the soft switching on/off setting unit via a first base resistor.

9. The light emitting device as claimed in claim 8, wherein the light emitting unit is a light emitting diode.

* * * * *